(12) United States Patent
Massignani

(10) Patent No.: US 6,500,331 B2
(45) Date of Patent: Dec. 31, 2002

(54) MACHINE FOR MICRO-FILTERING SOLID PARTICLES SUSPENDED IN A LIQUID STREAM

(76) Inventor: Donato Massignani, Contra's. Francesco, 6-36100 Vicenza (IT)

(*) Notice: Subject to any disclaimer, the term of this patent is extended or adjusted under 35 U.S.C. 154(b) by 0 days.

(21) Appl. No.: 09/781,400

(22) Filed: Feb. 13, 2001

(65) Prior Publication Data

US 2001/0017279 A1 Aug. 30, 2001

(30) Foreign Application Priority Data

Feb. 29, 2000 (IT) .......................................... VI00A0041

(51) Int. Cl.$^7$ .............................................. B01D 33/15
(52) U.S. Cl. ....................... 210/155; 210/158; 210/161; 210/327; 210/330; 210/391
(58) Field of Search ................................ 210/155, 158, 210/161, 327, 330, 391, 333.01, 393

(56) References Cited

U.S. PATENT DOCUMENTS

| | | | | |
|---|---|---|---|---|
| 914,758 A | * | 3/1909 | Schumann | 210/158 |
| 1,568,572 A | * | 1/1926 | Shaw | 210/158 |
| 2,458,139 A | * | 1/1949 | Boucher | 210/391 |
| 3,542,198 A | * | 11/1970 | Borjeson | 210/327 |
| 4,086,168 A | * | 4/1978 | Moore | 210/330 |
| 5,116,490 A | | 5/1992 | Fontenot | 210/158 |
| 5,124,029 A | * | 6/1992 | Fjällström et al. | 210/327 |

FOREIGN PATENT DOCUMENTS

| | | |
|---|---|---|
| EP | 0 388 709 | 9/1990 |
| FR | 602 884 | 4/1926 |
| GB | 1 002 819 | 9/1965 |

* cited by examiner

*Primary Examiner*—Christopher Upton
(74) *Attorney, Agent, or Firm*—Dykema Gossett, PLLC

(57) ABSTRACT

The invention relates to a machine for micro-filtering solid particles suspended in a liquid stream comprising: a couple of coaxial filtering discs each rotating round its own axis arranged horizontal and normal to direction of the flow to be treated and at least a partially cylindrical wall defining together with the rims of said couple of discs a hydraulic sealing coupling so as to enclose the liquid treating space comprising at least the rotation axis. Each disc of said couples of discs is provided with one or more washing ramps arranged outside said treating chambers and provided with nozzles throwing water against said discs at the portions emerging from the treating chamber. The washing water is collected by at least one liquid conveyance channel feeding the liquid back to the purification plant arranged upstream said machines.

9 Claims, 3 Drawing Sheets

MACHINE FOR MICRO-FILTERING SOLID PARTICLES SUSPENDED IN A LIQUID STREAM

The present invention relates to a machine for micro-filtering solid particles suspended in a liquid stream, more particularly water discharged from civil or industrial drainage.

It is known that drainage of civil or industrial waste water is governed by increasingly stricter laws. The European regulations presently provide that the micro-particles present in waste water should not exceed 35 mg per liter.

It is to be noted that the previous regulations, at least in force for industrial plants, allowed a concentration of micro-particles up to 80 mg per liter. Therefore there is now the need to lower the level of micro-particles from 80 mg per liter up to now allowed, to 35 mg per liter as now ruled.

In order to reach said results according to the prior art there are purification plants with sand filters, but these filters however have very big dimensions. Moreover the sand filters are limited because filtration is not continuous since said filters must be regenerated after a predetermined number of operation hours.

Another solution of the problem consists in using machines with a drum provided with filtering surfaces: the waste water to be treated is fed inside the drum and passes through the drum filtering surface. These filtering surfaces are periodically washed to avoid clogging.

One of the problems related to this filtering technique is that the machines are very big and cumbersome and their operation is expensive.

Another simpler and more efficient method to carry out filtering mainly of fibrous solids suspended in water, consists in using machines provided with filters comprising opposed rotary discs, in which water is introduced centrally in a direction almost tangent to the surface of the filtering discs and the combined action of disc rotation with water flow with a direction almost tangent to said disc, generates a force in a direction tangent to the disc and a direction normal to it. The normal component causes water to travel through the filter and carries out filtration while the tangential component is ineffective. During this filtering process a layer of fibers is formed and deposited adhering to the filtering surface, so that the fibers partially occlude the holes to which water is being filtered.

The bulk of fibers gradually formed in the filtration chamber carries out a sliding action on the surface of the filters causing the filtering holes to be self-cleaned. Obviously this self-cleaning action does not reach a perfect level. In other words these kinds of machines can operate in the above mentioned way only if they have sufficiently or relatively big holes so that the filtered water cannot have a contents of micro-particles with size less than 50 or 40 m$\mu$, that is not admitted with the present regulations.

The object of the present invention is to overcome the limits of the above described known technique.

More particularly the object is to make a machine carrying out a continuous micro-filtration with considerable water flow so as to result in a filtered water having a contents of micro-particles equal or less than 20 mg per liter.

Another intended object is to provide a machine adapted to process considerable volumes of water without requiring too big dimensions.

Another object to be obtained is to provide a machine which is relatively inexpensive and highly reliable in operation.

The above mentioned objects and others that will be better indicated hereinafter are attained by the machine of the invention that according to the wording of the first claim comprises:

a feeding chamber for the liquid to be treated communicating with one or more treating chambers, each of said chambers being defined by a couple of coaxial filtering discs rotating around their own axis arranged horizontally and normal to the direction of the water flow to be treated, and by at least a partially cylindrical wall defining together with the rims of said couple of discs, a hydraulic sealing coupling so as to enclose the liquid treating space to comprise at least the rotation axis;

conveyance chambers for the treated liquid provided with bottom outlets communicating with at least a collection chamber for the liquid coming from said conveyance chambers, provided with discharge pipes for said liquid;

means for transmitting the rotary motion to said filtering discs, wherein said micro-filtration machine is characterized in that each disc of said couples of discs is provided with one or more washing ramps arranged outside said treating chamber and provided with nozzles throwing water against said discs at the portion of said discs emerging from said treating chambers, the washing water being collected by at least one conveying channel for the liquid and the particles collected by said washing action, said channel being arranged between said couples of discs above the treating chamber and ending with a duct delivering the collected liquid to the purification plant arranged upstream said machine.

Advantageously the micro-filtration machine of the invention keeps the advantages of the known machines with couples of filtering discs allowing that the flow of water with suspended particles having a direction almost tangent to the discs, to intercept the disc holes according to a force component normal to the disc surface. The result of such combined action is that the disc hole is operatively smaller than the actual hole made in the disc.

The machine of the invention carries out its best performance when used downstream a water purification plant and more particularly downstream a conventional machine with filtering discs for instance of the kind disclose in European Patent 0 388 709 in the name of the same applicant. The substantial difference between the machine disclosed in European Patent EP 0 388 709 and the machine of the present invention consists in that in the machine of the present invention the self-cleaning action of the filter on the disc surface cannot be kept because filtering surfaces must be adopted with still smaller holes to obtain the micro-filtration required for lowering the contents of solids in the filtered liquid to at least 20 m$\mu$ or 20 mg per liter or even less.

Therefore it is clear that the filtering disc must be constantly cleaned from the filtered material so as to avoid clogging of the filtering holes.

Another advantage of the machine of the invention consists of the possibility of treating high rates of flow to be treated without needing a proportional increase of size and overall dimensions of the machine. This result is due to the effect created in the treating chamber by the hydrostatic head of the liquid to be treated. More particularly the increase of the diameter of the filtering discs and the consequent increase of the hydrostatic head generates a greater pressure on the surface of the filtering discs that in this way succeed to treat rates of liquid flow higher than the simple proportional increase of the filtering surface due to the increase of the diameter.

Further characteristics and features of the invention will be better understood from the detailed description of the machine with reference to the figures of the accompanying drawings in which.

Figure 1:
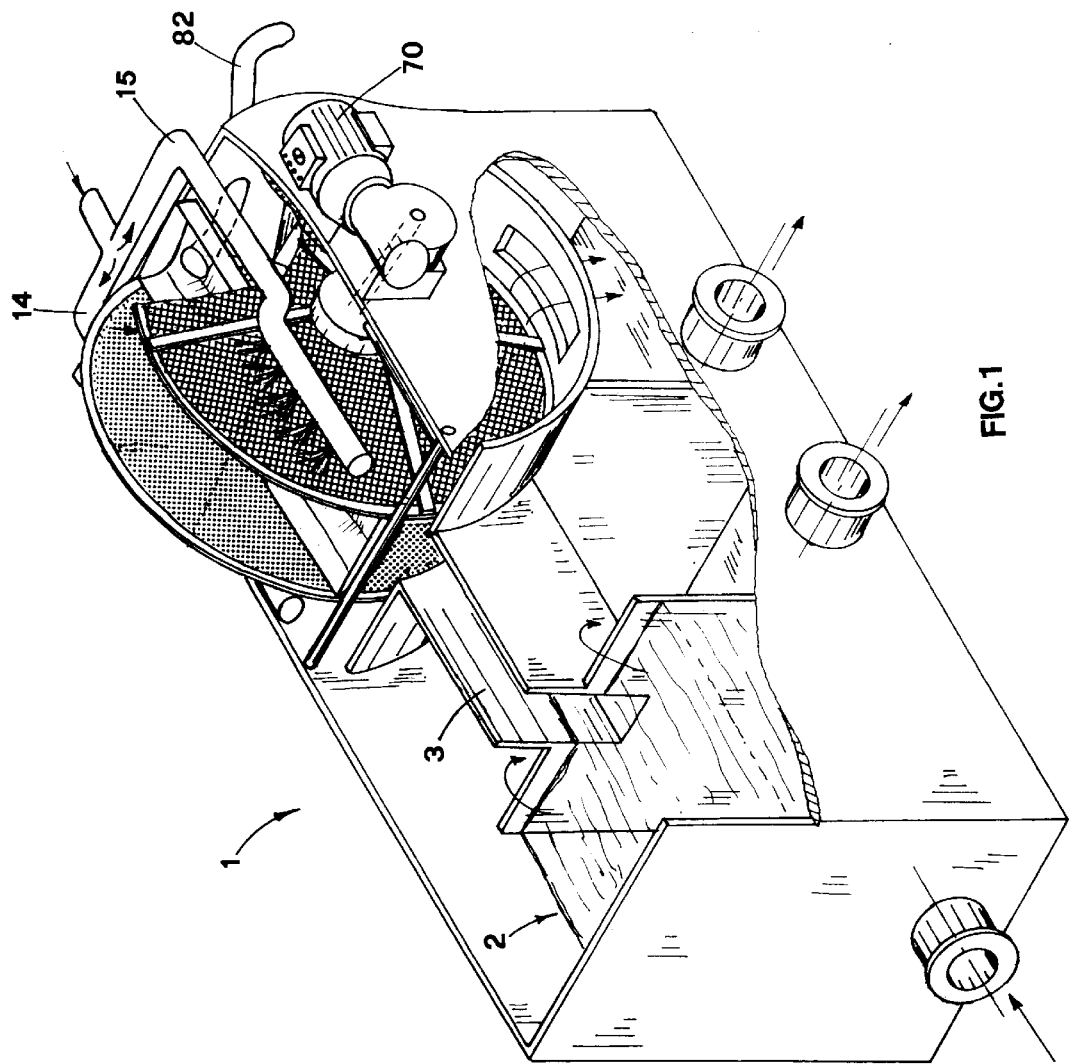
FIG. 1 is a perspective view of the machine of the invention in which the motion of the discs is obtained through an axial reduction gear.

With reference now to the drawings it is to be noted that the machine of the invention has a substantially box like shape in which there is a feeding chamber 2 for the flow of liquid to be treated, delivering through the feeding duct 3 the liquid to be treated to the treating chamber 4. Said treating chamber as shown in FIG. 1 and FIG. 3, is defined by two opposed discs 5 and 6 and the semi-cylindrical wall 7 extending between the discs 5 and 6 to the upper limit formed by the bottom 81 of the conveyance channel 8 that will be described hereinafter.

The treated water passes through the filtering discs 5 and 6 and reaches the conveying chambers 10 and 11 each provided with at least one discharge hole 101 and 110 conveying the treated water to the collection chamber 12 which is provided with a bottom outlet 121 for the final discharge of the treated liquid according to the regulations presently in force, that is with a concentration of solids lower than 20 mg per liter.

Figure 3:
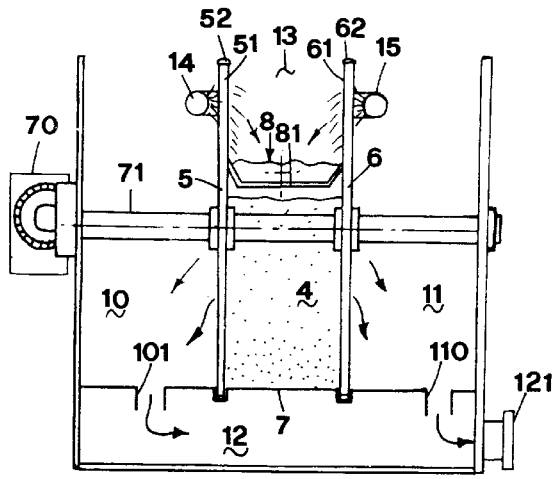
FIG. 3 is a sectional view of the machine of FIG. 1.

As shown in FIG. 3, above the treating chamber 4 there is a washing chamber 13 defined by the conveyance channel 8 arranged on the bottom of said chamber and the portions of the filtering discs 5 and 6 emerging from the treating chamber and indicated by reference numerals 51 and 61. The portions 51 and 61 of the discs emerging from the treating chambers are hit by strong jets coming from the washing ramps 14 and 15 so as to remove the filtered impurities from all the holes of the filtering surface of the discs. In this way the washed disc portion is circulated to the new filtering operation during the rotation of the discs without undergoing a decrease of the filtering action.

The washing water and the particles detached from the portions 51 and 61 of discs 5 and 6, are collected in the conveyance channel 8 provided with a discharge pipe 82 feeding again the so recycled water to the purification plants arranged upstream the machine of the invention.

Figure 2:
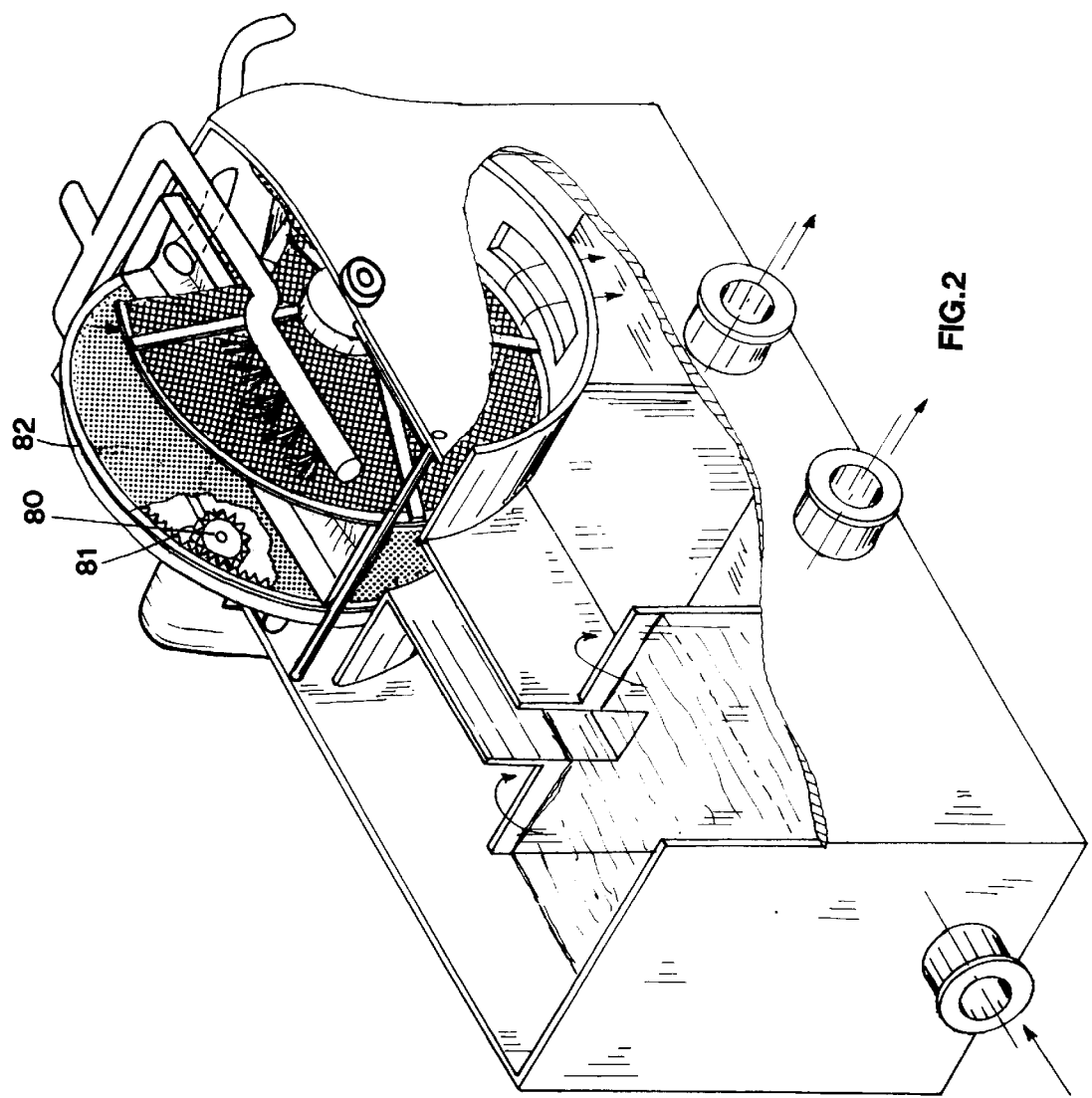
FIG. 2 shows the machine of the invention in which the motion of the discs is obtained through a circumferencial arrangement of pinion and wheel gear.
Figure 4:
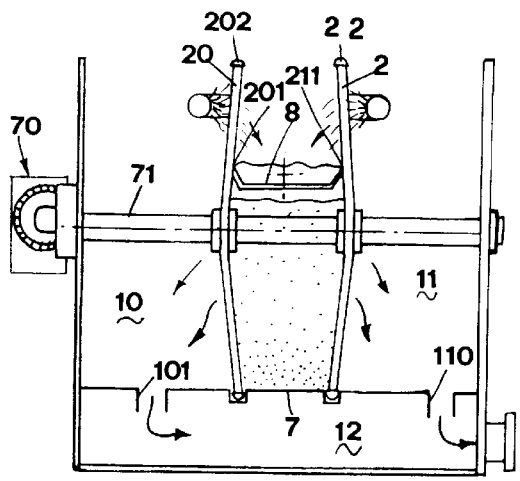
FIG. 4 is a sectional view of a version of the machine of FIG. 1 with conical discs.

In the embodiment shows in FIGS. 1, 2 and 3 the machine of the invention has discs 5 and 6 with flat surface. The operation of the machine does not change if the discs are not flat but are discs with frustum conical surface as those disclosed in European Patent EP 0 388 709. FIG. 4 indeed shows a sectional view of a constructional version of the machine of FIG. 1 in which the discs 20 and 21 are conical instead of being cylindrical. In this case the line of contact of conveyance channel 8 with discs 20 and 21 will be an arc indicated at 201 and 211 instead of a straight line.

For the rest the operation of the machine is not altered.

The embodiment of the machine illustrated in FIGS. 1 to 4 shows a machine with a couple of discs in which the means transmitting the motion are provided by a ratio motor 70 whose slow shaft not shown in the drawing is coaxial to the axis of the filtering discs so that the rotation torque is transmitted to the shaft 71 supporting the discs 5 and 6 of FIGS. 1 and 3 and the discs 20 and 21 of FIG. 4.

It is also to be noted that the machines of FIGS. 1 to 3 and the version of FIG. 4 have discs provided on their circumference with gaskets 52 and 62 for the discs 5 and 6 and 202 and 212 for the discs 20 and 21, respectively. These gaskets work on the cylindrical curved bottom plate 7 so that there is a sealing action between said bottom plate and the discs and all the water is filtered without loss of hydraulic seal between the discs and the bottom plate 7.

In a constructional version shown in FIG. 2 the transmission of the motion to the couples of opposed discs of the machine is carried out by a pinion and wheel gear group where the pinion 80 is engaged with the wheel gear 81 mounted on the inner circumference of disc 82. This construction is particularly suitable for machines having filtering discs with a big diameter where the torque at the axis would be very high and therefore it is advisable to use a ratio motor having a sufficiently high rotation speed at the pinion so as to use ratio motors with low torque.

Figure 5:
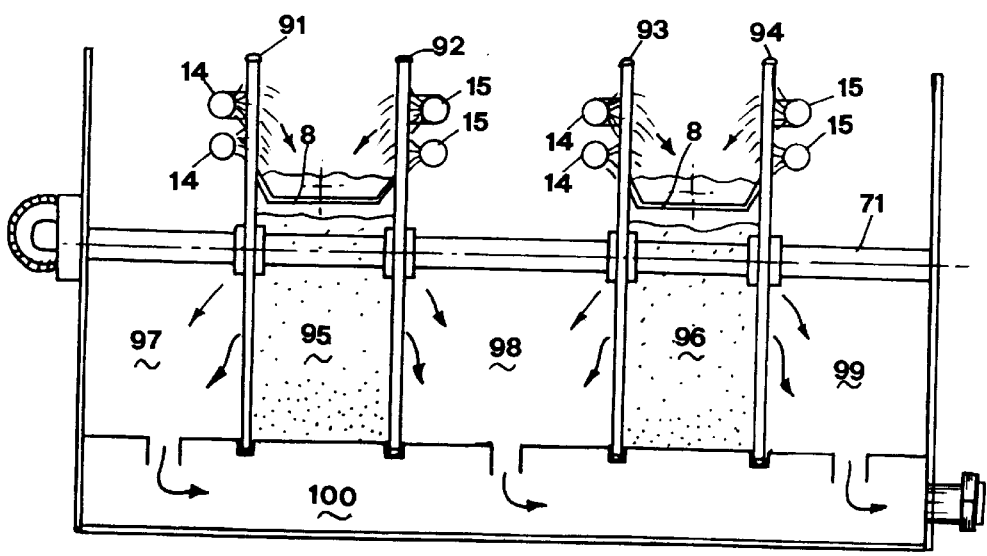
FIG. 5 is a sectional view of another version of the machine of the invention provided with two couples of discs.

According to a further constructional version shown in the sectional view of FIG. 5, the micro-filtration machine of the invention is provided with two couples of discs indicated with 91, 92 and 93, 94 respectively. In this case said couples of discs will define two treating chambers 95 and 96 and three conveyance chambers 97, 98 and 99 conveying the filtered water to a collection chamber indicated with 100. A conveyance channel 8 will anyway be provided between the couple of discs 91 and 92 and also between the couple of discs 93 and 94. Obviously each couple of discs will be provided with the washing ramps indicated with 14 and 15.

As to the filtering surface of the discs, such surface may be carried out with micro-perforated metal sheet, for instance of stainless steel, or resistant plastic textile fabric also provided with micro-holes or equivalent means. It is apparent that by cleaning continuously the filters at their upper portion outside the treating chamber, the filtering discs can steadily carry out at best their operation and filtration may take place in the best way without machine stops and warranting a constant filtration quality.

What is claimed is:

1. A machine for micro-filtering solid particles suspended in a liquid stream, said machine comprising:

a feeding chamber communicating through a duct with one or more treating chambers, each of said treating chambers being defined by at least two coaxial filtering discs rotating around their own axis arranged horizontally and normal to the direction of the flow to be treated, and at least one partially cylindrical wall defining together with rims of said at least two discs a hydraulic sealing coupling to enclose the liquid treating space comprising at least the rotation axis;

conveyance chambers for the treated liquid provided with bottom outlets communicating with at least one collection chamber for the liquid coming from said conveyance chambers, provided with liquid discharge pipes; and means for transmitting rotation motion to said filtering discs, wherein each disc of said at least two discs is provided with one or more washing ramps arranged outside said treating chambers and provided with nozzles discharging water against said discs at portions of said discs emerging from said treating chambers, said washing water being collected by at least one conveyance channel for the liquid and the particles collected by washing said at least two discs, arranged between said at least two discs above the treating chamber and ending with a duct feeding the liquid back to the purification plant arranged upstream said machine.

2. The machine according to claim 1, wherein said at least two filtering discs have a generally flat surface.

3. The machine according to claim 1, wherein said at least two filtering discs have a generally frustum conical surface.

4. The machine according to claim 1, wherein each of said at least two discs is provided on its circumferential rim with a gasket for providing the hydraulic seal with the partially cylindrical wall defining said treating chamber.

5. The machine according to claim 1, wherein the partially cylindrical wall is provided with gaskets for providing the hydraulic seal between said wall and said at least two filtering discs sliding on said wall.

6. The machine according to claim 1, wherein the means for transmitting the rotation motion to said at least two filtering discs comprises a ratio motor connected to the horizontal shaft supporting said at least two filtering discs.

7. The machine according to claim 1, wherein the means for transmitting the rotation motion to said at least two filtering discs comprises a ratio motor having a slow shaft integral with a pinion engaged with a wheel gear arranged on the circumference of a filtering disc.

8. The machine according to claim 1, wherein said at least one conveyance channel contacts said at least two discs to form an arc shape.

9. The machine according to claim 1, wherein each said at least two discs are in confronting relationship with each said at least one conveyance channel to form an arc shape with said at least one conveyance channel.

* * * * *